April 13, 1926. 1,580,923
J. N. SELVIG
CLUTCH CONTROLLING MECHANISM
Filed March 15, 1924 3 Sheets-Sheet 1
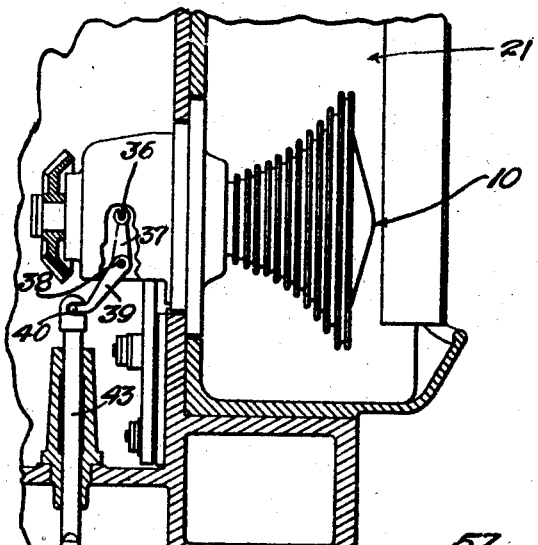
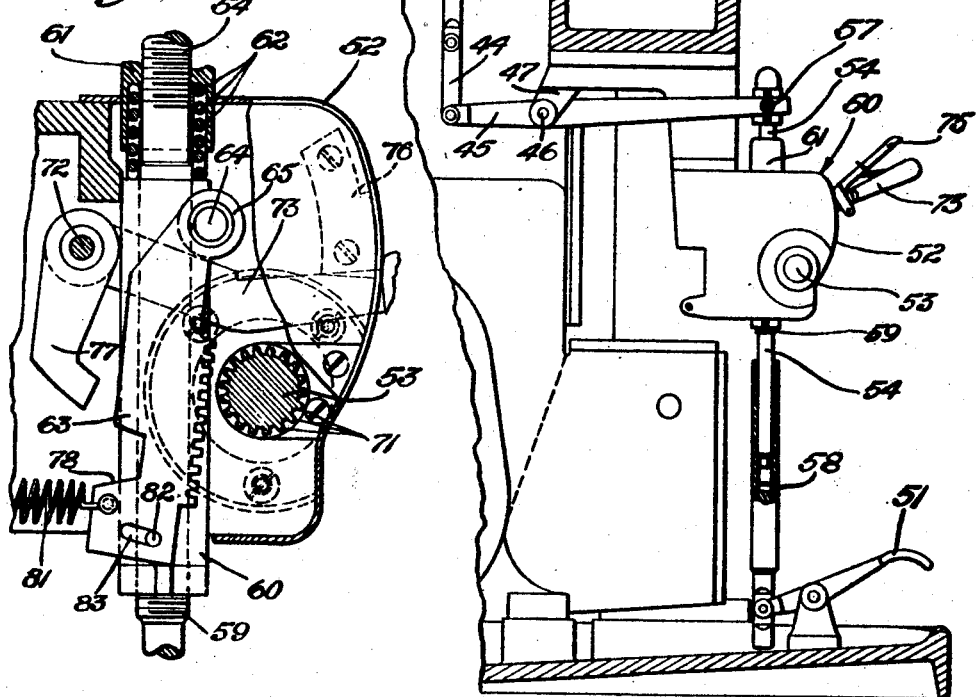
Inventor
John N. Selvig

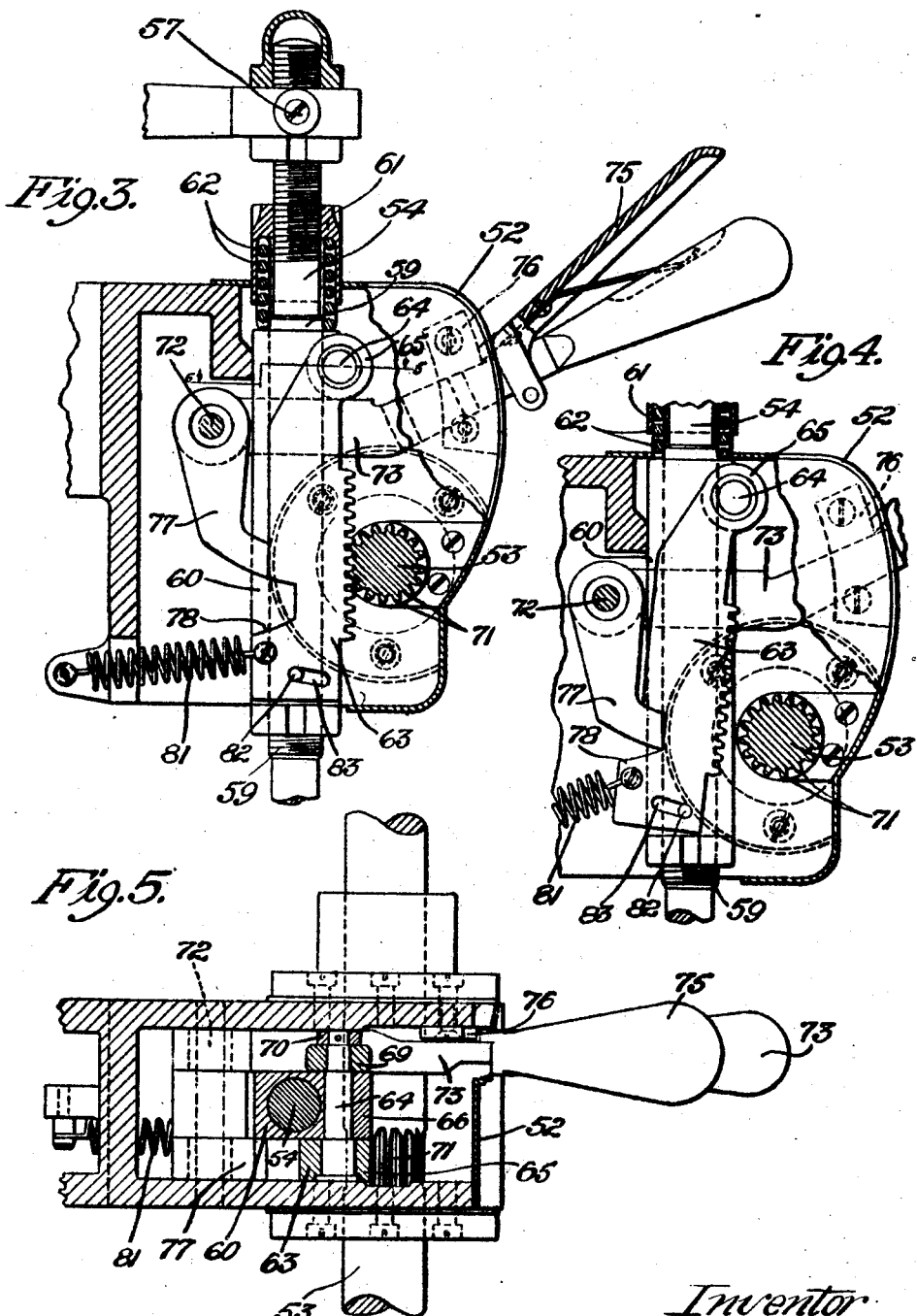

April 13, 1926.
J. N. SELVIG
1,580,923
CLUTCH CONTROLLING MECHANISM
Filed March 15, 1924
3 Sheets-Sheet 3
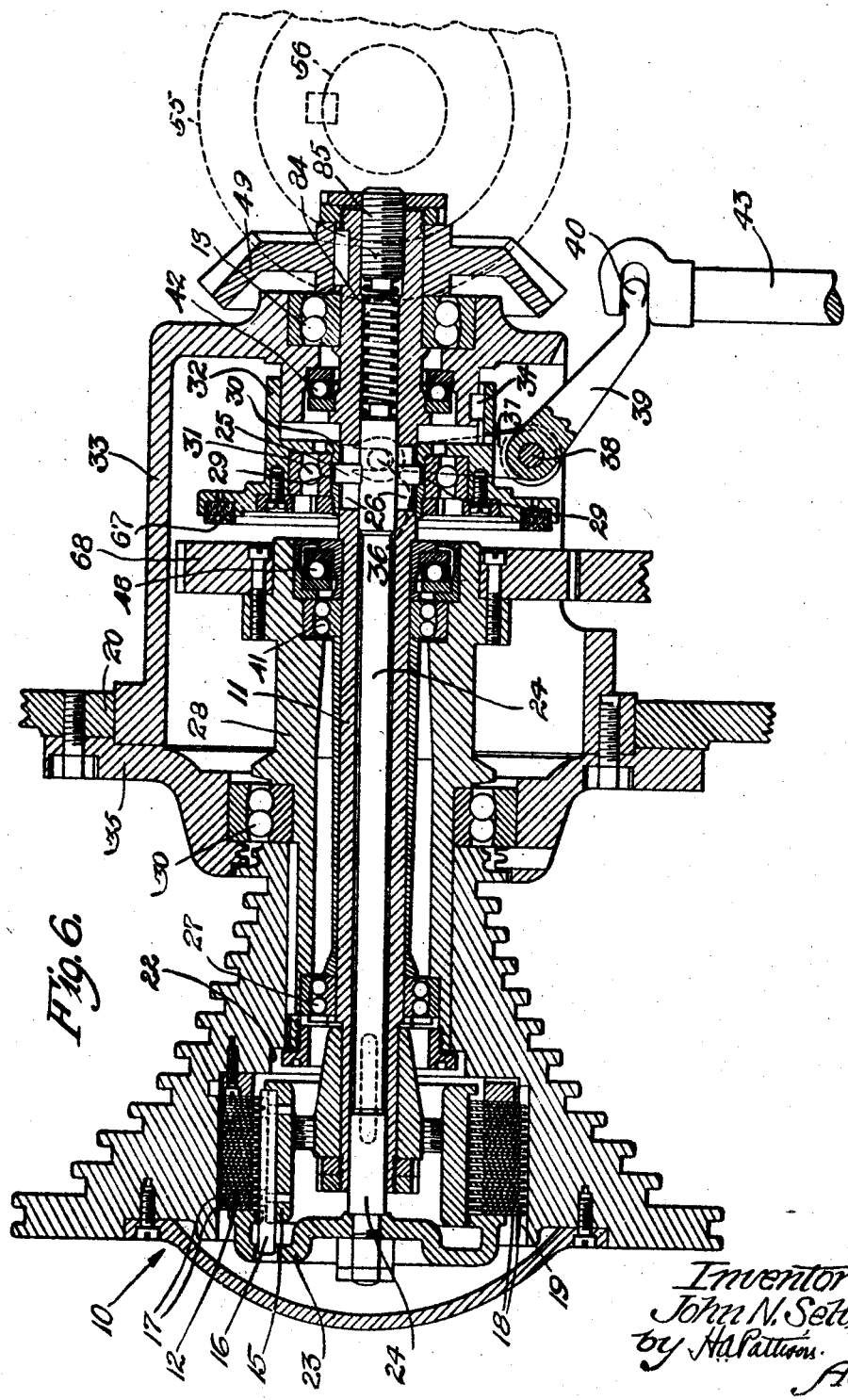
Inventor
John N. Selvig
by H.A. Pattison
Atty.

Patented Apr. 13, 1926.

1,580,923

UNITED STATES PATENT OFFICE.

JOHN NILSEN SELVIG, OF CHICAGO, ILLINOIS, ASSIGNOR TO WESTERN ELECTRIC COMPANY, INCORPORATED, OF NEW YORK, N. Y., A CORPORATION OF NEW YORK.

CLUTCH-CONTROLLING MECHANISM.

Application filed March 15, 1924. Serial No. 699,509.

*To all whom it may concern:*

Be it known that I, JOHN NILSEN SELVIG, a subject of the King of Norway, residing at Chicago, in the county of Cook and State of Illinois, have invented certain new and useful Improvements in Clutch-Controlling Mechanisms, of which the following is a full, clear, concise, and exact description.

This invention relates to improvements in clutch controlling mechanism and more particularly to mechanisms for automatically engaging the members of a clutch.

An object of the invention is to provide an improved mechanism for automatically engaging the members of a clutch.

Another object of the invention is to provide a mechanism for engaging the members of a clutch so that successive engagements thereof will be uniform and similar in character.

A further object of the invention is to provide a mechanism which will expeditiously take up all lost motion between the clutch members and the control mechanism, and thereafter impart to the members gradually increasing engaging pressures until a maximum positive drive is effected.

A still further object of the invention is to provide a mechanism wherein the engagement of the clutch members may be controlled either manually or automatically.

In accordance with the general features of this invention there is provided a driven member movable into engagement with a driving member by an operating lever, the movement imparted to the driven member being in turn transmitted to an elastic leverage system. The first part of this movement functions to quickly take up all lost motion between the parts of the control mechanism and to bring the driven and driving members of the clutch into contact while the latter part of the movement functions to automatically engage the members of the clutch with gradually increasing pressures. At the end of a predetermined movement of the driven member it is disengaged from the driving member and the members of the clutch are retained in maximum driving engagement. Upon a release of the operating lever the control mechanism and clutch members are expeditiously returned to their normal positions. A manually controlled mechanism is also provided for engaging the members of the clutch.

The accompanying drawings illustrate one embodiment of the invention applied to a wire drawing machine in which, Fig. 1 is a fragmentary side view partly in section of a wire drawing machine embodying features of the invention;

Fig. 2 is an enlarged fragmentary vertical sectional view of the clutch controlling mechanism forming the subject of the invention shown in its normal position;

Figs. 3 and 4 are similar views showing the parts in the act of causing the engagement of the clutch which it controls and at the end of an operation, respectively;

Fig. 5 is a plan sectional view taken on the line 5—5 of Fig. 3 looking in the direction of the arrows, and Fig. 6 is an enlarged vertical sectional view of the capstan of a wire drawing machine showing in detail the clutch mechanism for connecting it to and disconnecting it from the driving elements of the machine.

In the drawings a plural faced capstan is indicated at 10 which is adapted to be connected to and disconnected from a driving shaft 11 in the form of a sleeve (Fig. 6) by a clutch mechanism 12, the clutch being illustrated in its operated position. The shaft 11 is rotatably mounted within suitable anti-friction bearings 13 supported by a bracket 33 carried by the rear wall 20 of a compartment 21. The other end of the shaft 11 is supported by an axial anti-friction bearing 27 supported by a sleeve 28 concentric with the shaft 11, the said sleeve being rotatably mounted on an external anti-friction bearing 30 carried by a bracket 35 also secured to the rear wall 20 of the compartment 21. The sleeve 28 is also supported on an internal anti-friction bearing 41 mounted between the said sleeve and the shaft 11. The shaft 11 and sleeve 28 are provided with thrust bearings 42 and 48 respectively. Secured to the outer end of the shaft 11 is a bevel pinion 49 which meshes with a bevel gear 55 (shown in dotted outlines), splined to a shaft 56 rotatably mounted within suitable bearings (not shown) secured to the framework of the machine and driven by a motor or other suitable means (not shown). The clutch mechanism 12 comprises an annular member 15 secured to the inner end of the driving sleeve 11, the said member having secured thereto by means of a pin 16 a plurality of clutch disks 17. Alternately mounted between the clutch disks 17 are clutch disks 18 which are secured by a pin 19 to the inner peripheral wall of a cup shaped opening 22 made in the capstan 10. The disks 17 and 18 are movable longitudinally on the pins 16 and 19 respectively, and when pressure is exerted to force the disks together they form a driving connection between the capstan 10 and the driving sleeve 11 as may be readily understood.

The means for exerting pressure upon the disks 17 and 18 comprises a plate 23 which engages the outermost disk, and when the plate is moved toward the right (Fig. 6) into the position shown, serves to exert sufficient pressure upon the disks to cause them to rotate together. The disk 23 is fastened to one end of a shaft 24 mounted within the driving sleeve 11. A transverse pin 25 is secured in the shaft 24 and projects through diametrically opposite longitudinal slots 26 formed in the driving sleeve 11 and into openings 29 formed in a sleeve 30 rotatable on axial bearings 31 carried by a housing 32. The housing 32 is splined to the bracket 33 by a key 34 which prevents the housing from turning, but permits a longitudinal movement thereof, relative to the driving sleeve 11. Through the medium of the pin 25 and slots 26 the shaft 24 and housing 32 are movable together longitudinally of the driving sleeve 11. Secured to the sides of the housing 32 at diametrically opposite points are pins 36 which receive the bifurcated ends of a fork member 37, which is pivoted at 38 to a link 39. The link has secured to its free end a pin 40 which fits within a slot formed in the upper end of a vertically reciprocable rod 43. The lower end of the rod 43 is connected by a link 44 with one end of a lever 45 which is pivoted at 46 to a bracket 47 carried by the framework of the wire drawing machine. The other end of the lever 45 is connected through the medium of a clutch controlling mechanism 50 to a foot pedal 51.

The clutch controlling mechanism 50 is housed within a casing 52 secured to the frame of the wire drawing machine and passing horizontally therethrough (see Fig. 5) is a driving shaft 53 which is constantly driven at a suitable speed from the main driving element of the wire drawing machine through suitable gearing (not shown). Passing vertically through the casing is a rod 54 connected at its upper end to the lever 45 through a suitable swivel connection indicated at 57, the lower end of the rod having a sliding fit in a tubular member 58, which is pivotally connected at its lower end to the short end of the foot pedal 51. The rod 54 is provided with an enlarged portion, indicated at 59 upon which is slidably mounted within the casing 52, a sleeve 60 which is rectangular in cross section as indicated in Fig. 5. Encircling the rod 54 between the upper end of the sleeve 60 and a cup shaped adjusting nut 61 screw threaded upon the upper end of the rod 54 is a compression spring 62. Positioned at one side of the sleeve 60 is a rack bar 63 (see Figs. 3 and 5) which is pivotally supported upon the sleeve 60 by a shouldered pin 64 passing through bosses 65 and 66 formed on the bar 63 and sleeve 60 respectively. Upon the end of the pin 64 opposite the bar 63 is a roller 69 secured in position upon the pin 64 by a collar 70 suitably secured to the pin 64. Formed upon the shaft 53 in line with the gear teeth upon the rack bar 63 is a gear 71. Pivotally supported upon the frame of the machine by a pin 72 is an operating lever 73 equipped with a trip finger indicated at 75. The trip finger 75 cooperates with a toothed plate 76 to hold the operating lever 73 in its operated position as clearly shown in Figs. 3 and 4 after being moved from its normal position as shown in Fig. 2. Integral with the pivotal end of the lever 73 is a pawl 77 the engaging end thereof adapted to enter a notch 78 formed in the rack bar 63 when the mechanism has been operated to engage the clutch as shown in Fig. 4. Secured to the rack bar 63 at a point below the notch 78 is a tension spring 81 the opposite end of the spring being secured to the frame of the machine. Mounted upon the sleeve 60 is a pin 82 which projects into a suitably shaped slot 83 formed in the rack bar 63. The function of the pin 82 and slot 83 is to limit the movement of the rack bar 63 about the pivot pin 64 in either direction as clearly shown in Figs. 3 and 4.

It will be apparent that by varying the speed of the shaft 53 and the compression of the spring 62 the time within which the clutch disks 17 and 18 are pressed into a position where a maximum positive drive is effected, after the locking of the lever 73 in its upper position as indicated in Fig. 3 or in other words the engagement of the clutch may be made in a predetermined interval of time.

The operation of this mechanism is as follows:

In wire drawing machines, during the threading and stringing of the wire through the dies and the wrapping thereof around the capstans, it is essential to the efficient operation of the machine that an operator have his hands free to manipulate the wire.

During the threading and stringing operation it is necessary that the clutch 12 be engaged and disengaged in close succession, and to facilitate the engagement and disengagement of the clutch at this time the operator uses the foot pedal 51 which upon being depressed from the position shown in Fig. 1 raises the member 58 and consequently the rod 54 is raised due to the lower end thereof resting on the bottom of the bore in the member 58 as shown in Fig. 1.

Upon a movement upwardly of the rod 54 through the medium of the lever 45 and link 44, the rod 43 is moved downwardly as viewed in Fig. 1. As the rod 43 moves downwardly the housing 32 is moved to the right as viewed in Fig. 6 longitudinally of the shaft 11 through the medium of the link 39 and the forked member 37. The housing 32 carries with it the shaft 24 through the medium of the pin 25 causing the plate 23 carried by the shaft to exert sufficient pressure on the disks 17 and 18 to cause them to form a driving connection between the driving sleeve 11 and capstan 10 as shown in Fig. 6. The operator upon releasing the foot treadle 51 upon the completion of the threading and stringing operation allows the parts to return to their normal position as shown in Figs. 1 and 2 which movement is effected by the energy stored in a compression spring 84 (Fig. 6) which has one of its ends in engagement with the shaft 24 and its other end against a plug 85 screwed within the end of the driving sleeve 11. Upon completion of the threading and stringing operation the machine is prepared to draw the wire through the drawing dies (not shown). In engaging the clutch 12 to operate the capstan 10, it is desirable that the clutch be engaged in a minimum amount of time and at gradually increasing pressures, until a maximum speed is obtained without any deleterious shocks or strains being imparted to the wire which would tend to weaken it or cause it to break. To engage the clutch by means of the automatic clutch controlling mechanism 50, the operating lever 73 is moved upwardly about its pivot 72, from its normal position shown in Fig. 2 to the position shown in Figs. 3 and 4, whereupon it is held by the trip finger 75 engaging the plate 76.

In the normal position of the mechanism 50 as viewed in Fig. 2, it will be observed that the roller 69 rests against the top of the operating lever 73 with the pawl 77 spaced apart from the rack bar 63. In the upward movement of the operating lever 73 the rack bar 63 is raised, and with it the sleeve 60 due to the pin 64, which carries the roller 69 passing through the bosses 65 and 66 formed upon the bar 63 and sleeve 60 respectively. As the sleeve 60 is moved upwardly the spring 62 is compressed slightly against the inside of the adjusting nut 61 screw threaded upon the rod 54, thereby causing the rod 54 to be raised and through the lever 45 and link 44, the rod 43 will be moved downwardly to press the clutch disks 17 and 18 into contact ready to be pressed into a gripping engagement. During this movement the pawl 77 carried by the lever 73 is moved into engagement with the rack bar 63, thereby causing the teeth on the rack to mesh with the revolving gear 71. This position of the parts is clearly shown in Fig. 3. Upon the meshing of the rack bar 63 and gear 71 the bar 63 will be moved slowly upward and through the pin 64 in the manner before described, the sleeve 60 is also raised. Thus the spring 62 is further gradually compressed against the inside of the adjusting nut 61, thereby raising the rod 54 and in the manner before described a gradually increasing pressure is transmitted to the clutch disks, whereby a driving connection is formed between the driving sleeve 11 and the capstan 10, without deleterious shocks or strains being imparted to the wire. As the spring 62 is gradually compressed the pressure upon the plate 23 is increased in a direction to the right as viewed in Fig. 6 at a predetermined rate. As the pressure between the disks is increased the speed of rotation of the driven clutch disks is of course increased and thereby the speed of rotation of the capstan 10. The upward movement of the rack bar will continue until the notch 78 formed therein aligns with the end of the pawl 77, whereupon due to the action of the spring 81 the rack bar will be moved about its pivot to disengage the teeth thereon from the gear 71. This position of the parts is clearly indicated in Fig. 4.

In this position of the parts, the clutch will continue to be engaged until the operator trips the finger 75 from the plate 76, whereupon due to the action of the spring 84 of the clutch and to the action of gravity the parts will be restored to their normal position as shown in Figs. 1 and 2.

The housing 32 of the clutch mechanism 12 in moving toward the left when the clutch is disengaged, as hereinbefore described, engages a brake member 67 carried thereby against the adjacent surface of an annular member 68 secured to the capstan and serves to stop the rotation thereof.

What is claimed is:

1. In a mechanism for controlling a clutch, a driving member, a driven member pivotally and reciprocally mounted, said members having cooperating surfaces adapted to form a driving connection therebetween, means for moving the driven member about its pivot to engage the driving member, and means cooperating with the driven member upon a longitudinal movement thereof to effect an engagement of the clutch.

2. In a mechanism for controlling a clutch, a driving member, a driven member pivotally and reciprocally mounted adjacent thereto, said members having cooperating surfaces adapted to form a driving connection therebetween, means for actuating said driven member to effect an engagement thereof with the driving member, an elastic leverage system cooperating with the driven member upon a longitudinal movement thereof to impart to the clutch members gradually increasing engaging pressures and means associated with the driven member for causing a disengagement of the driving and driven members when the desired pressure between the clutch members is attained.

3. In a mechanism for controlling a clutch, a driving member, a reciprocally mounted driven member, said members having cooperating surfaces adapted to form a driving connection therebetween, an elastic leverage system cooperating with the driven member upon a longitudinal movement thereof to effect the engagement of the clutch, means for actuating said driven member to effect an engagement thereof with the driving member, said means adapted upon a movement thereof from its inoperative position to its operative position to cause said elastic leverage system to first take up all lost motion between the parts of the control mechanism and the clutch members and thereafter to impart to the clutch members gradually increasing engaging pressures at a predetermined rate of speed.

4. In a mechanism for controlling a clutch, a driving gear, a pivotally and reciprocally mounted gear rack adapted to be moved about its pivot and into engagement with said driving gear to effect a longitudinal movement of said gear rack, means for moving said gear rack about its pivot, a reciprocally mounted sleeve adapted to be moved by said gear rack in its longitudinal movement, and an elastic leverage system associated with said sleeve and adapted upon a longitudinal movement thereof to impart to the clutch members gradually increasing engaging pressures.

5. In a mechanism for controlling a clutch, a driving member, a pivotally and reciprocally mounted driven member adapted to be moved about its pivot and into engagement with said driving member, said members having cooperating surfaces adapted to form a driving connection therebetween, means for moving the driven member about its pivot to engage the driving member, whereupon a longitudinal movement is imparted to the driven member, said driven member pivotally supported upon a reciprocally mounted sleeve, a leverage system between the sleeve and the clutch members, and a compression spring interposed between the sleeve and leverage system to impart to the clutch members gradually increasing engaging pressures upon a longitudinal movement of the driven member.

In witness whereof, I hereunto subscribe my name this 28th day of February A. D., 1924.

JOHN NILSEN SELVIG.